United States Patent
Smith

(10) Patent No.: US 6,714,070 B1
(45) Date of Patent: Mar. 30, 2004

(54) DIFFERENTIAL CHARGE AMPLIFIER WITH BUILT-IN TESTING FOR ROTATION RATE SENSOR

(75) Inventor: Thad W. Smith, Antioch, CA (US)

(73) Assignee: BEI Technologies, Inc., San Francisco, CA (US)

(*) Notice: Subject to any disclaimer, the term of this patent is extended or adjusted under 35 U.S.C. 154(b) by 0 days.

(21) Appl. No.: 10/072,136

(22) Filed: Feb. 7, 2002

(51) Int. Cl.[7] .............. H03F 3/45; H03F 1/00; H01L 41/04
(52) U.S. Cl. .............. 330/69; 330/174; 310/311
(58) Field of Search .............. 330/69, 124 R, 330/174; 310/311, 319

(56) References Cited

U.S. PATENT DOCUMENTS

| 5,220,836 | A | * | 6/1993 | Harms et al. ............... 73/702 |
| 5,388,458 | A |   | 2/1995 | Weinberg et al. |
| 5,426,970 | A |   | 6/1995 | Florida et al. |
| 5,453,604 | A | * | 9/1995 | Narabu ............... 235/454 |
| 5,600,063 | A |   | 2/1997 | Ogawa |
| 5,654,550 | A | * | 8/1997 | Nomura et al. ............... 250/338.3 |

FOREIGN PATENT DOCUMENTS

WO    0107875    2/2001

* cited by examiner

Primary Examiner—Patricia Nguyen
(74) Attorney, Agent, or Firm—Edward S. Wright

(57) ABSTRACT

Differential charge amplifier for processing charge signals from a rotation rate sensor, with a test signal being applied to the differential charge amplifier so that during normal operation the output of the amplifier corresponds to the test signal as well as to the charge signals.

10 Claims, 3 Drawing Sheets

DIFFERENTIAL CHARGE AMPLIFIER WITH BUILT-IN TESTING FOR ROTATION RATE SENSOR

This invention pertains generally to rotation rate sensors and, more particularly, to a differential charge amplifier with a built-in test circuit for use in a rotation rate sensor.

Rate sensors with piezoelectric structures such as tuning forks rely on the Coriolis effect to sense rotation. The drive side of the tuning fork is driven in an oscillator circuit, with an automatic gain control (AGC) circuit keeping the current to the drive crystal constant. When the tuning fork is rotated, the pick-up tines develop an out-of-plane mode of vibration due to the Coriolis force. This vibration is detected piezoelectrically, and the resulting charge signal is directly proportional to the angular rate of rotation. That signal is converted from a charge signal to a voltage signal in a device known as a charge amplifier.

A commonly used charge amplifier circuit is shown in FIG. 1. This is a single-ended circuit in which the pick-up high electrode on the tuning fork is connected to the inverting input of the charge amplifier $QA_1$, and the pick-up low electrode is connected to virtual ground $V_g$. A feedback resistor $R_f$ and a feedback capacitor $C_f$ are connected between the output and the inverting input of the amplifier. The resistive element provides a DC feedback path, and the capacitive element provides AC feedback. The capacitive element also provides the transfer function for the charge signal which is proportional to the angular rate at the drive fork frequency:

$$V_{out}(t) = -q_m(t)/C_f.$$

The non-inverting input of charge amplifier $QA_1$ is also connected to virtual ground, and with a unipolar power supply, virtual ground is set to be one-half of the supply voltage in order to maximize the dynamic range of the amplifier. With a bipolar power supply, the pick-up low electrode and the non-inverting input of the charge amplifier are typically connected to a ground reference instead of the virtual ground.

FIG. 2 illustrates a single-ended charge amplifier with a built-in test circuit, as disclosed in U.S. Pat. No. 5,426,970, the disclosure of which is incorporated herein by reference. In this system, a continuous built-in test signal CBIT is coupled to the pick-up output of the tuning fork through the pick-up low electrode. This signal is an attenuated version of the drive signal for the tuning fork and when superimposed on the output of the fork, it acts as a large AC bias signal. The CBIT bias passes through all elements of the signal path in the rate sensor until it is subtracted out either in software or in hardware.

By this process, the tuning fork and all of the gain stages in the forward rate channel are verified to be functional. If any of these elements should fail, the CBIT bias at the output will not be equal and opposite to the cancellation signal, and this shift in output is interpreted as an indication of the failure.

Being unbalanced circuits, the charge amplifiers of FIGS. 1 and 2 are more susceptible to common-mode noise than a balanced circuit would be. In addition, noise gain is a function of stray capacitance on the inverting input of the amplifier, and the DC offset of the amplifier usually needs to be blocked in subsequent stages in order to preserve dynamic range and linearity.

FIG. 3 illustrates a differential charge amplifier which provides a balanced circuit for differential measurement of the pick-up fork signal. In this circuit, the two pick-up electrodes are connected to the inputs of differential amplifier $QA_1$, resistor $R_{d1}$ and capacitor $C_{d1}$ are connected between the output and the inverting input, and resistor $Rd_2$ and capacitor $C_{d2}$ are connected between the non-inverting input and virtual ground, with $Rd_2$ being equal to $R_{d1}$, and capacitor $C_{d2}$ being equal to $C_{d1}$. In this circuit, charge or current once again flows through the feedback elements, converting the output to a voltage-mode signal, but with two signal paths of equal impedance, one for each output of the pick-up fork.

The output of the differential amplifier can be either differential or single-ended. Although the charge amplifier of FIG. 3 is shown as being referenced to virtual ground for a unipolar power supply, a power ground reference is typically used with a bipolar supply.

The differential charge amplifier has several advantages over a single-ended circuit. It provides a 6 dB increase in signal-to-noise ratio (SNR) due to the gain of 2 in the differential circuit. The balanced structure provides increased common-mode rejection, which attenuates common-mode noise and further increases SNR. DC offset is also greatly attenuated because the circuit has a large common-mode rejection at DC.

The differential charge amplifier of FIG. 3 also has certain limitations and disadvantages. The common-mode rejection of the circuit is dominated by the matching of the RC passive components as opposed to the common mode rejection of the operational amplifier. Moreover, the circuit cannot be configured for continuous built-in testing. The circuit is balanced for differential detection of a charge such as a rate signal, but any voltage signal appearing on either electrode of the pick-up fork will automatically be present on the other electrode due to the virtual input of the operational amplifier.

It is in general an object of the invention to provide a new and improved charge amplifier.

Another object of the invention is to provide a charge amplifier of the above character which overcomes the limitations and disadvantages of the prior art.

These and other objects are achieved in accordance with the invention by providing a differential charge amplifier for processing charge signals from a rotation rate sensor, and means for applying a test signal to the differential charge amplifier so that during normal operation the output of the amplifier corresponds to the test signal as well as to the charge signals.

Figure 1:
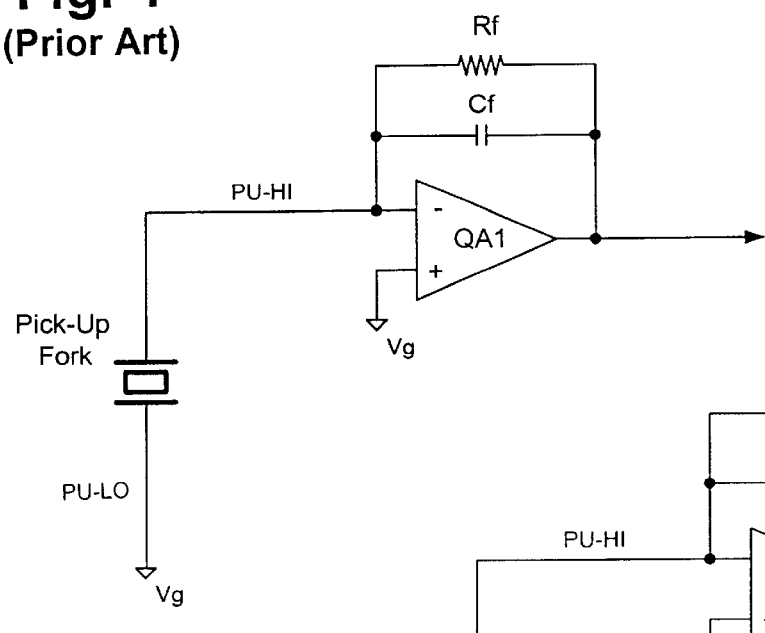
FIG. 1 is circuit diagram of a single-ended charge amplifier of the prior art.
Figure 2:
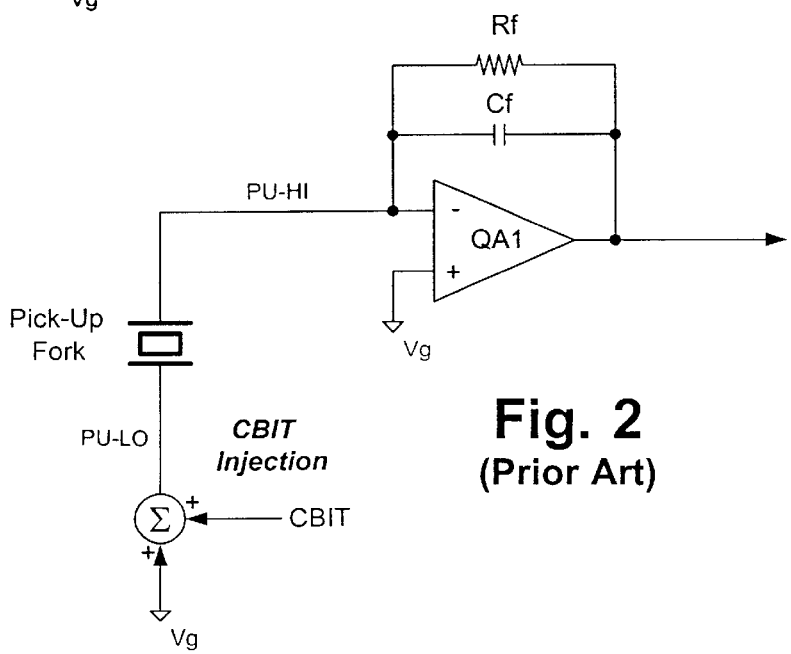
FIG. 2 is a circuit diagram of a charge amplifier of the prior art with built-in testing.
Figure 3:
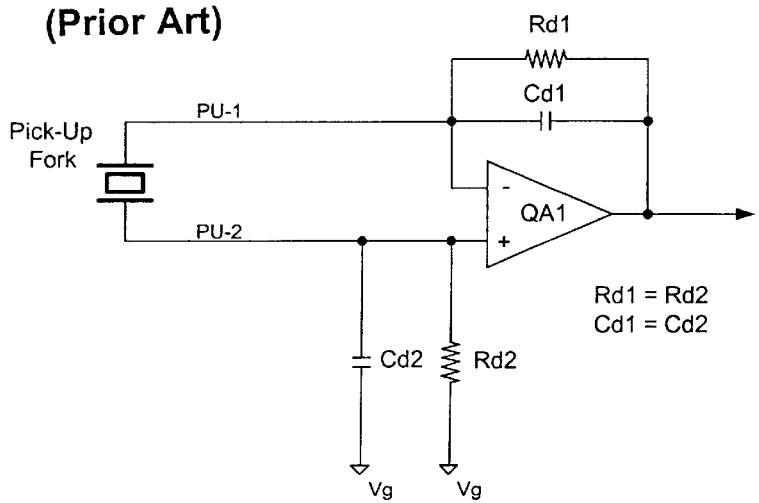
FIG. 3 is a circuit diagram of a differential charge amplifier of the prior art.
Figure 4:
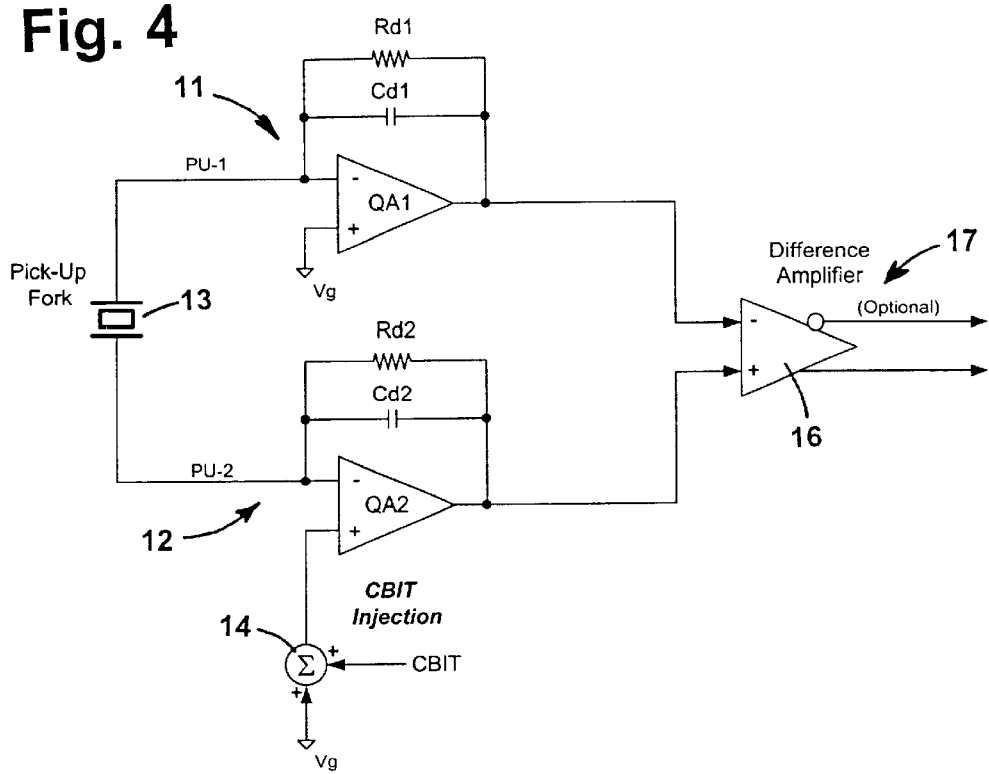
FIG. 4 is a circuit diagram of one embodiment of a differential charge amplifier incorporating the invention.

As illustrated in FIG. 4, the differential charge amplifier includes a pair of input channels 11, 12 consisting of charge amplifiers $QA_1$, $QA_2$, with feedback resistors $R_{d1}$, $Rd_2$ and feedback capacitors $C_{d1}$, $C_{d2}$ connected between the outputs and the inverting inputs of the charge amplifiers. Charge signals from pick-up fork 13 are applied to the two differential charge amplifiers in a balanced manner, with the signals PU-1 and PU-2 from the pick-up high and pick-up low electrodes being applied to the inverting inputs of amplifier $QA_1$ and $QA_2$, respectively.

A test signal CBIT is applied to the inputs of the charge amplifiers in an unbalanced manner so as to produce different outputs from the two amplifiers during normal operating conditions. In the embodiment of FIG. 4, this is done by injecting the CBIT signal into the non-inverting input of charge amplifier $QA_2$ through a summing circuit 14. The non-inverting input of charge amplifier $QA_1$ is connected to a virtual ground reference $V_g$, as is a second input of the summing circuit. As in the prior art, the CBIT signal is a scaled down version of the drive signal applied to the tuning fork.

The outputs of charge amplifiers $QA_1$, $QA_2$ are connected to the inverting and non-inverting inputs of a difference amplifier 16 in the output stage 17 of the circuit. This amplifier can be either single-ended or differential, and it produces an output signal which corresponds to the difference in the outputs of the two charge amplifiers produced by the CBIT signal.

Figure 5:
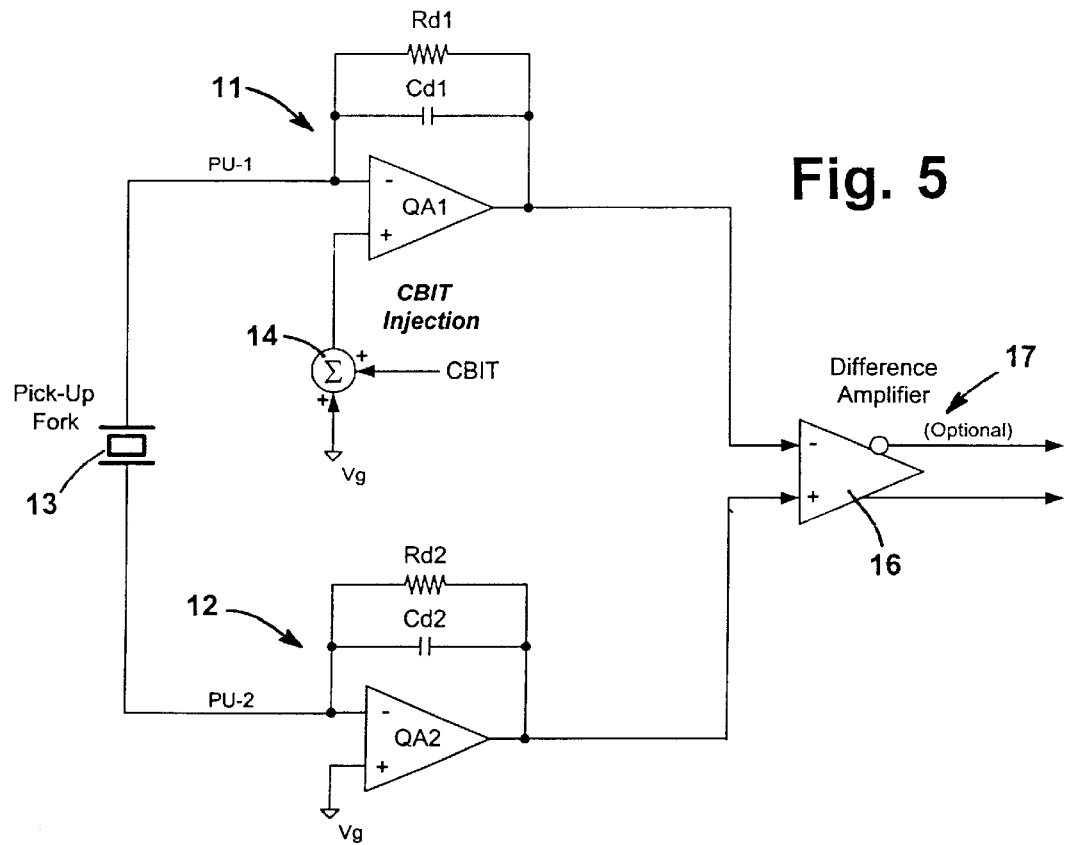
FIG. 5 is a circuit diagram of another embodiment of a differential charge amplifier incorporating the invention.

The embodiment of FIG. 5 is similar to the embodiment of FIG. 4 except that in this embodiment the CBIT signal is injected into non-inverting input of charge amplifier $QA_1$ rather than $QA_2$.

In both embodiments, the shunt capacitance $C_0$ of the piezoelectric structure essentially becomes a common component of parallel voltage gain paths which have common amplification factors. This generates the offset signal to be monitored. By applying the CBIT signal to the reference input, it is isolated from the balanced input circuit by the high input impedance of the charge amplifier to which it is applied.

Operation of the two embodiments is similar except that injecting the CBIT signal into the non-inverting input of charge amplifier $QA_1$ generates a negative built-in test (BIT) rate signal, whereas injection into the non-inverting input of charge amplifier $QA_2$ generates a positive BIT rate signal. If a pickup fork connection breaks, the output of difference amplifier 16 shifts positively for CBIT injection into charge amplifier $QA_1$ and negatively for CBIT injection into charge amplifier $QA_2$. In either case, the shift is toward the nominal zero rate output level, which in the embodiments illustrated is virtual ground.

Figure 6:
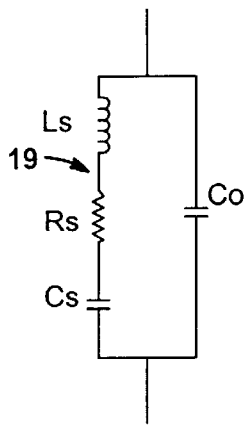
FIG. 6 illustrates the circuit of an equivalent model of the piezoelectric tuning fork in the embodiments of FIGS. 4 and 5.
Figure 7:
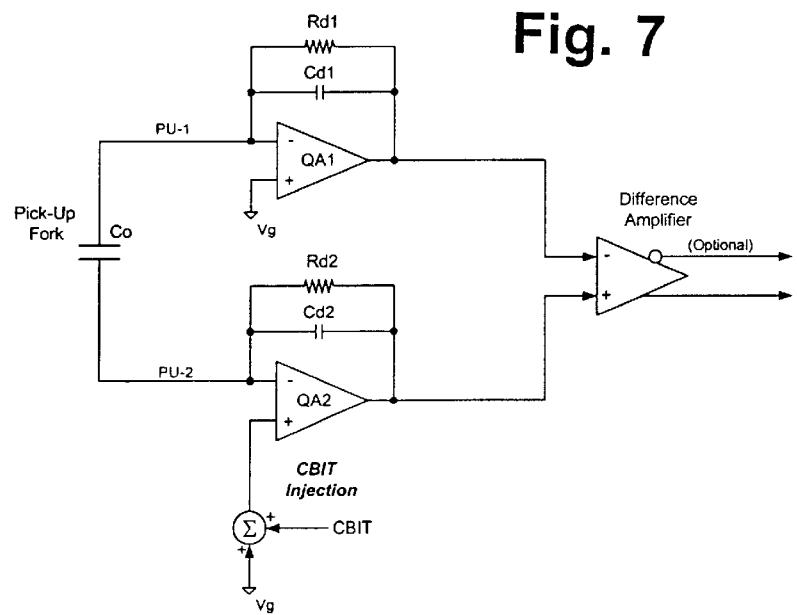
FIGS. 7 and 8 are equivalent circuits of the embodiment of FIG. 4.

As illustrated in FIG. 6, an equivalent model of pick-up fork 13 operating in its fundamental mode consists of a series RLC circuit 19 in parallel with the shunt capacitance $C_0$ of the fork. Since the CBIT signal is at the drive fork frequency, rather than the resonant frequency of the pick-up fork, the RLC series circuit is essentially an open circuit, or high impedance, to the CBIT signal. Hence, the equivalent model of the pick-up fork at the CBIT and drive signal frequency is just the shunt capacitance $C_0$. FIG. 7 illustrates the embodiment of FIG. 4 with the equivalent pick-up fork model.

Figure 8:
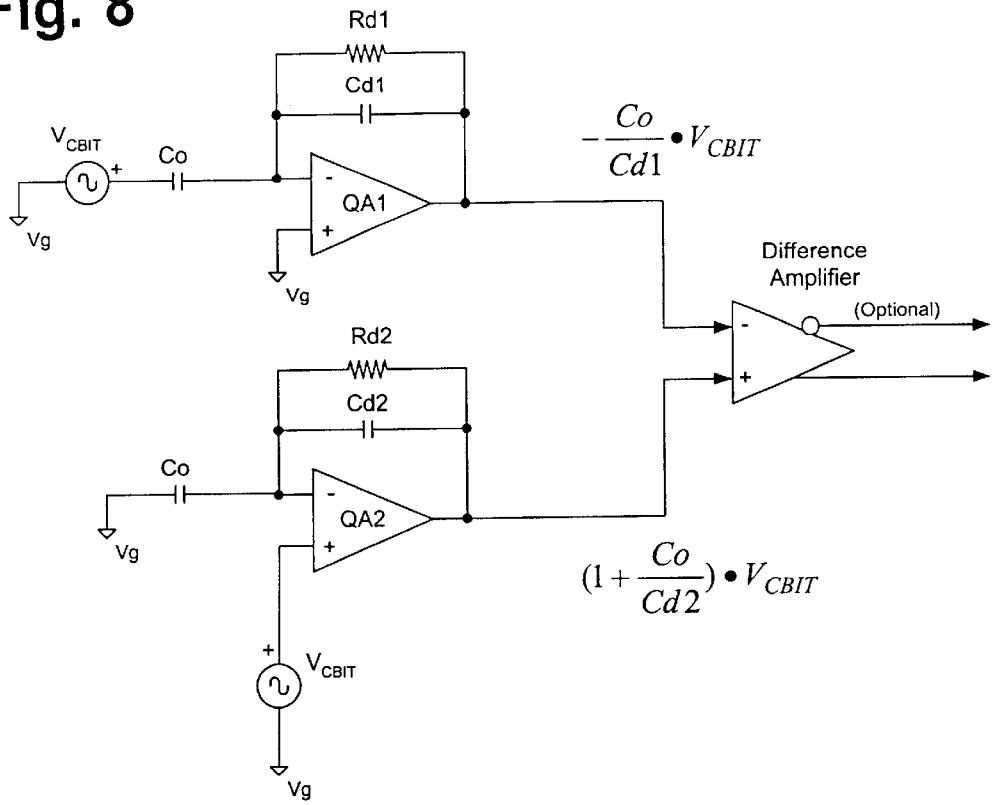

The equivalent CBIT circuit corresponding to FIG. 7 is shown in FIG. 8. As shown in this figure, the CBIT signal is injected into the non-inverting input of charge amplifier $QA_2$, which forms a non-inverting gain amplifier with shunt capacitance $C_0$. The output signal from this amplifier, $(1+C_0/C_{d2}) \cdot V_{CBIT}$, is applied to the positive input of difference amplifier 16.

The other path for the CBIT signal is an inverting gain amplifier formed by the combination by charge amplifier $QA_1$ and shunt capacitance $C_0$. The input signal to this amplifier is the CBIT signal which is present at the inverting input of charge amplifier $QA_2$, and the output signal from this amplifier, $-(C_0/C_{d1}) \cdot V_{CBIT}$, is applied to the negative input of difference amplifier 16.

The normal, steady state output of the difference amplifier, whether single-ended or differential, is an a.c. bias signal with a value $$V_{out} = K \cdot V_{CBIT} \cdot (1+2C_0/C_d),$$

where K is the gain of the amplifier and $C_d = C_1 = C_2$. If the pick-up fork breaks, the shunt capacitor $C_0$ will disconnect, causing a change in the output signal which will then have the value $$V_{out} = K \cdot V_{CBIT1}.$$

Moreover, if any component fails in the forward rate channel path, a detectable shift in output shall occur as the CBIT signal and the cancellation signal generated further down the rate signal path will not null each other out any more. The magnitude of the signal shift for CBIT failure detection is $$\Delta V_{out} = K \cdot V_{CBIT} \cdot 2C_0/C_d.$$

The invention has a number of important features and advantages. It provides a balanced differential circuit for charge amplification with CBIT injection which produces an offset for fault detection. In addition, a break in the pick-up fork connection produces an output signal that can be detected as a failure in the forward rate channel path.

It is apparent from the foregoing that a new and improved charge amplifier has been provided. While only certain presently preferred embodiments have been described in detail, as will be apparent to those familiar with the art, certain changes and modifications can be made without departing from the scope of the invention as defined by the following claims.

What is claimed is:

1. A differential charge amplifier for a rotation rate sensor having a piezoelectric structure with first and second pick-ups that provide charge signals corresponding to rotation of the structure, comprising: a pair of input channels to which the charge signals are applied in a balanced differential manner, means for applying a test signal to the two input channels in an unbalanced manner so that the two channels produce different outputs in response to the test signal, and an output stage responsive to the difference between the outputs of the two input channels.

2. The differential charge amplifier of claim 1 wherein the test signal is applied to one of the input channels through the shunt capacitance of the piezoelectric structure.

3. In a differential charge amplifier for a rotation rate sensor having a piezoelectric structure with first and second pick-ups that provide charge signals corresponding to rotation of the structure: first and second charge amplifiers having first inputs to which the charge signals from respective ones of the pick-ups are applied and second inputs to which a reference is applied, means for applying a test signal to the second input of one of the charge amplifiers, and a difference amplifier responsive to output signals from the charge amplifiers.

4. The differential charge amplifier of claim 3 wherein the charge amplifier to which the test signal is applied is connected to a non-inverting input of the difference amplifier.

5. The differential charge amplifier of claim 3 wherein the charge amplifier to which the test signal is applied is connected to an inverting input of the difference amplifier.

6. In a differential charge amplifier for a rotation rate sensor having a piezoelectric structure with first and second pick-ups that provide charge signals corresponding to rotation of the structure: a first charge amplifier having an inverting input to which the first pick-up is connected and a non-inverting input which is connected to a reference level, a second charge amplifier having an inverting input to which the second pick-up is connected and a non-inverting input, means for applying a test signal to the non-inverting input of the second charge amplifier, and a difference amplifier having an inverting input to which the output of the first charge amplifier is connected and a non-inverting input to which the output of the second charge amplifier is connected.

7. In a differential charge amplifier for a rotation rate sensor having a piezoelectric structure with first and second pick-ups that provide charge signals corresponding to rotation of the structure: a first charge amplifier having an inverting input to which the first pick-up is connected and a non-inverting input, means for applying a test signal to the non-inverting input of the first charge amplifier, a second charge amplifier having an inverting input to which the second pick-up is connected and a non-inverting input which is connected to a reference level, and a difference amplifier having an inverting input to which the output of the first charge amplifier is connected and a non-inverting input to which the output of the second charge amplifier is connected.

8. A circuit for processing charge signals from pick-ups on a piezoelectric structure in a rotation rate sensor, comprising: a differential charge amplifier for providing an output signal corresponding to the charge signals from the pick-ups, and means for applying a test signal to the differential charge amplifier so that during normal operation the output signal corresponds to the test signal as well as to the charge signals.

9. The circuit of claim 8 wherein the test signal is applied to one input of the differential charge amplifier through the shunt capacitance of the piezoelectric structure and is also applied directly to a second input of the differential charge amplifier.

10. A differential charge amplifier for processing charge signals from a rotation rate sensor, with means for applying a test signal to the differential charge amplifier so that during normal operation the output of the amplifier corresponds to the test signal as well as to the charge signals.

* * * * *